March 4, 1969 R. GILMONT 3,430,813

MICROMETRIC DISPENSER

Filed April 17, 1967 Sheet 1 of 2

INVENTOR
ROGER GILMONT
BY James and Franklin
ATTORNEY 76
74
60
64
72
68
70
46
58

INVENTOR
ROGER GILMONT
BY James and Franklin
ATTORNEY 3,430,813
MICROMETRIC DISPENSER
Roger Gilmont, Douglaston, N.Y., assignor to Cole-Parmer Instrument and Equipment Company, Chicago, Ill., a corporation of Illinois
Filed Apr. 17, 1967, Ser. No. 631,337
U.S. Cl. 222—43 2 Claims
Int. Cl. G01f 11/06; B67d 5/42

ABSTRACT OF THE DISCLOSURE

A pump-type dispenser in which the degree of movement of the piston, and hence the volume of liquid dispensed on each cycle of operation, is adjustably controlled by structure mounted on the piston rod.

The present invention relates to a micrometric dispenser designed to produce repetitive delivery of liquids in accurately controlled amounts, with means being provided for precisely varying the amount of liquid to be dispensed.

It often occurs, both in production installations and in laboratories, that rapid repetitive dispensing of a predetermined amount of liquid is required, with the precise amount needed varying from time to time. Dispensing devices capable of accomplishing these results are available, but they are in general complicated, expensive, and in many instances constituted by heavy, relatively fixed pieces of equipment.

It is the prime object of the present invention to devise a repetitive dispenser which will, when actuated, dispense accurately predetermined amounts of liquid, with the amount of liquid to be dispensed being readily and accurately adjustable, all by means of structure which is simple, reliable, and inexpensive. It is a further prime object of the present invention to accomplish these results by what is in effect a tool capable of use wherever needed rather than a fixed piece of equipment.

A further object of the present invention is to produce a device which may very readily be disassembled and cleaned, a factor of considerable importance in laboratory applications where the device is to be successively used with a plurality of reagents.

The dispenser is constituted by a light, simple pump structure comprising a cylinder and a piston. Fluid inlets and outlets are provided to the cylinder, and a piston rod extends from the cylinder for actuation to cause the piston to sealingly slide within the cylinder, that piston rod passing through a wall at the operating end of the cylinder. In accordance with the present invention the piston rod is provided with first and second stop means located respectively inside and outside the cylinder and engageable with said cylinder so as to limit the degree to which the piston rod can be slid into and out from the cylinder, thus correspondingly limiting the degree of movement of the piston within the cylinder and hence the amount of fluid delivered by the device upon each cycle of reciprocation of the piston. At least one of these stop means is adjustably positionable along the length of the piston rod, thereby to permit adjustment of the piston movement and hence of the volume of fluid dispensed on each cycle of operation. In order to provide for exceedingly precise control of the location of the adjustable stop means relative to the piston rod it is preferably constructed in micrometer-like fashion, the stop means being defined by a sleeve extending along the piston rod, threadedly engaged with the piston rod at a point remote from the cylinder wall, the piston rod and end of the sleeve directed toward the cylinder having cooperating indicia thereon to indicate the precise amount of axial movement permitted to the piston within the cylinder.

Since the lateral dimensions of the cylinder are known, these indicia may be directly calibrated in terms of the volume of fluid to be dispensed.

As specifically disclosed the dispensing device is integrated with a part defining a bottle stopper and adapted to be received, preferably sealingly, within the open neck of a reagent bottle. The inlet to the cylinder extends downwardly beyond the bottle stopper part in such a fashion as to be received inside a bottle when the bottle stopper part is inserted into the neck of the bottle, thereby to extend into the liquid contents of the bottle and define a conduit through which the liquid in the bottle flows into the cylinder. A second conduit communicating with the fluid outlet from the cylinder extends out from the cylinder so as to be accessible when the bottle stopper part is inserted in the bottle. As a result the device can be transferred from one bottle to another and can function as a bottle stopper when not in active use and as an adjustably calibrated dispenser when in active use.

Since the device may be used with liquids which tend to foul the cylinder and piston, or with a series of different reagents under circumstances where purity is important, it is desirable that the dispenser be readily disassembled for cleaning purposes. This is very easily accomplished with the device of the present invention, particularly in the form here specifically disclosed, where the cylinder end wall through which the piston rod slides is readily removable from the cylinder, along with the piston and piston rod, this removal being accomplished merely by unscrewing a retaining element and lifting the wall-piston rod-piston unit out from the open operating end of the cylinder. The cylinder and contents, and preferably the bottle stopper part as well, are formed of a single piece of glass, while the piston rod, the cylinder end wall, the piston and appurtenances may well be formed of appropriate corrosion-resistant plastic materials which may readily be cleaned with conventional liquid cleaning agents.

The device may be actuated either manually or automatically, but a feature of its construction is that it is capable of one-hand operation, thus leaving the other hand of the operator free to direct the output from the device to precisely the desired place and making the device exceedingly suitable for use in laboratory or production installations where an accurately predetermined amount of reagent is to be supplied in rapid succession to a plurality of containers such as test tubes.

To the accomplishment of the above, and to such other objects as may hereinafter appear, the present invention relates to the construction of an adjustable volume dispenser as defined in the appended claims and as described in this specification taken together with the accompanying drawings, in which:

FIG. 2 is a fragmentary view similar to FIG. 1 and showing the piston and piston rod moved up as far as the fixed stop means permits.

Figure 1:
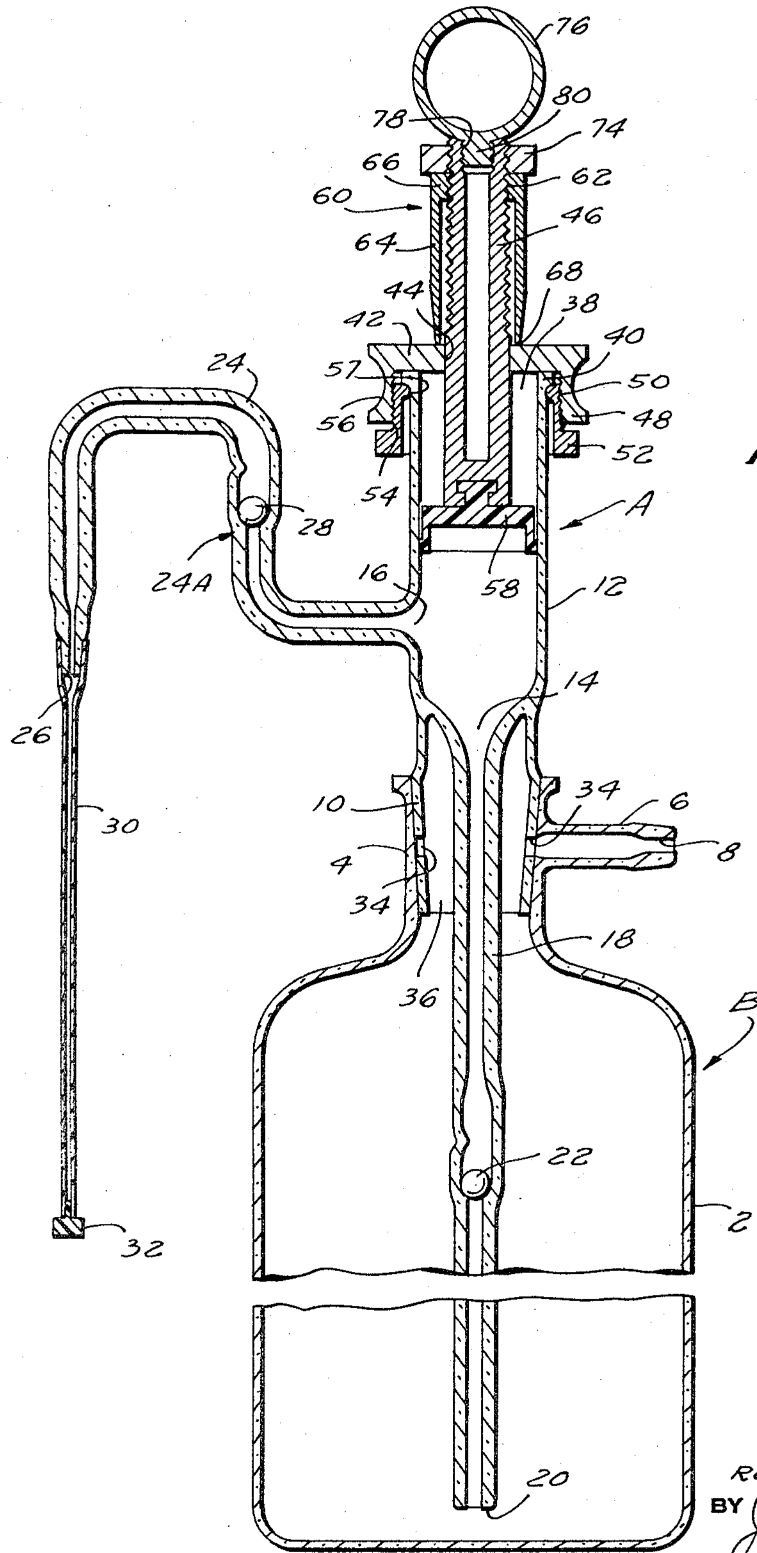
FIG. 1 is a cross sectional view of a preferred embodiment of the present invention in place in the neck of a reagent bottle, the piston and piston rod being shown moved down as far as the adjustable stop means permits.

In the preferred embodiment here specifically illustrated the dispensing device, generally designated A, is shown positioned on a bottle generally designated B which is adapted to contain a supply of the liquid or other reagent which the device A is to dispense in accurately measured doses. The bottle B comprises a body portion 2 and a neck 4, and it may have an absorption vent 6 extending laterally from the neck 4 as shown, the vent 6 having a passage 8 therethrough communicating between the inside of the neck 4 and outside of the vent 6.

The dispensing device A comprises a mounting part 10 in the form of a bottle stopper and therefore preferably being externally tapered so as to fit into bottle necks 4 of appropriate size and shape. Mounted on the part 10 is a cylinder 12 having a fluid inlet 14 at the bottom thereof and a fluid outlet 16 at the side thereof. The fluid inlet 14 communicates with a conduit 18 extending down from the cylinder 12 inside the bottle stopper part 10 and terminating in a tip 20 located well below the bottle stopper part 10. A ball check valve 22 is located within the conduit 18 and oriented so as to permit fluid flow upwardly therethrough from the tip 20 to the cylinder inlet 14 but to prevent fluid flow in the opposite direction. The cylinder outlet 16 communicates with a conduit 24 which extends out laterally from the cylinder 12 at a point above the bottle stopper part 10 and which terminates in a tip 26 positioned to one side of the cylinder 12 and preferably laterally spaced therefrom sufficiently so as to extend out beyond the side wall of a typical bottle B in which the bottle stopper part 10 may be received. The conduit 24 has a vertically extending section 24A within which the check valve 28 is located, that check valve being oriented so as to permit fluid flow from the cylinder outlet 16 to the conduit tip 26 but to prevent fluid flow in the opposite direction. The conduit tip 26 may define a Luer joint. For ease in directing the fluid output from the device to the desired point, a flexible tube 30 may be secured to the conduit tip 26, the free end of that tube 30 being provided with a removable plug 32.

The bottle stopper part 10, the cylinder 12 and the conduits 18 and 24 may be formed of glass, and preferably of a unitary piece of glass. The tube 30 and plug 32 may be formed of any suitable chemically resistant flexible material, of which Teflon is typical. The balls defining the operative parts of the check valves 22 and 28 are preferably formed of ground glass.

The conduit 18, as it extends down through the bottle stopper 10, is preferably radially spaced from the wall defining that part, and that wall may be provided with one or more apertures 34 which, as the bottle stopper part 10 is rotated within a given bottle neck 4, may be moved into and out of registration with the passage 8 in the vent 6 forming a part of the bottle B, the openings 34 communicating with the space 36 between the conduit 18 and the bottle stopper part 10, that space 36 being open at its bottom and therefore communicating with the interior of the bottle B.

The upper end 38 of the cylinder 12 is open, and is provided with a radially outwardly extending rim 40. A wall 42 is adapted to rest upon the upper end of the cylinder 12 and close the opening 38, that wall 42 having a central opening 44 therein through which a piston rod 46 is freely slidable. The wall 42 is provided with a depending flange 48 which extends around and down past the cylinder rim 40 and which is threaded on its internal surface, at 50. A slotted nut 52 is received around the cylinder 12 and has a threaded external surface 54 adapted to be threadedly engaged with the internal threaded surface 50 of the flange 48. The nut 52 also has a radially inwardly extending rim 56 which is adapted to engage the underside of the cylinder rim 40. The outer surface of the flange 48 is made concave, at 56, so that the flange 48 may more readily be grasped by the fingers of the user.

Attached to that end of the piston rod 46 which extends down below the wall 42 and into the cylinder 12 is a piston 58 which sealingly slidably engages the inner surface of the cylinder 12. Since the cylinder 12 is preferably formed of precision bore tubing and the cylinder-engaging surface of the piston 58 is preferably precision machined, slidability of the piston 58 within the cylinder 12 without leakage of liquid between the piston and cylinder is reliably assured. The piston 58 is, of course, larger than the opening 44 in the wall 42, the upper surface of the piston 58 thus defining a positive stop means engageable with the undersurface of the wall 42 (see FIG. 2) so as to limit the degree to which the piston rod 46 and the piston 58 may move upwardly.

Figure 3:
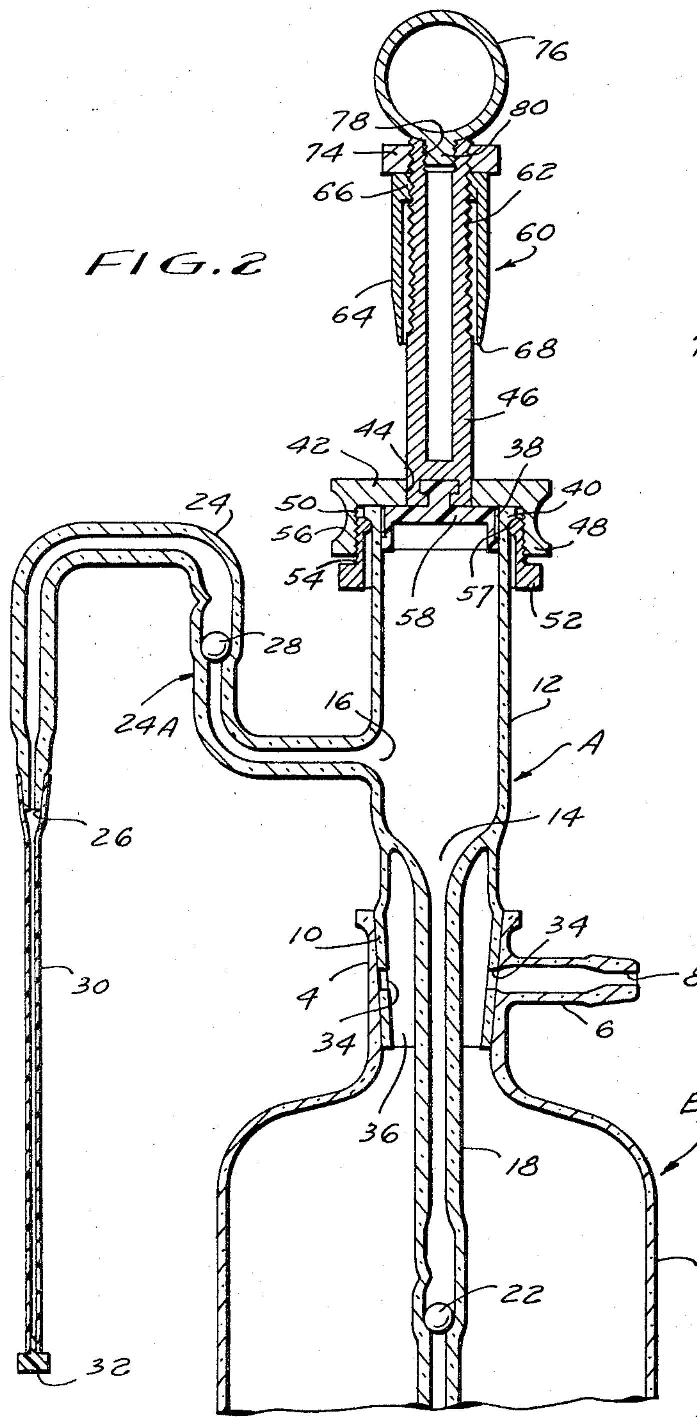
FIG. 3 is an elevational view of the piston-piston rod unit and the motion-limiting stops thereon.

A second positive stop means, generally designated 60, is mounted on that portion of the piston rod 46 which extends above the wall 42 and out of the cylinder 12, thereby to limit the degree to which the piston rod 46 and the piston 58 may be moved downwardly (see FIG. 1). The stop means 60 is adjustably mounted on the piston rod 46 so as to be positionable at different points along the length of the latter, thereby to vary the permissible extent of reciprocation of the piston rod 46 and piston 58, in this way adjustably controlling the volume of liquid to be dispensed on each cycle of actuation of the device. In the form here specifically disclosed, which has been found to give extremely accurate control of piston movement by means of simple structure, the outer surface of the upper portion of the piston rod 46 is externally threaded, at 62. A sleeve 64 extends around said upper portion of the piston rod 46, has an upper inwardly extending portion 66 which threadedly engages the piston rod threads 62, and has a tip 68 which extends down from the part 66 and is adapted to engage the wall 42 when the piston rod 46 is moved downwardly. As may best be seen from FIG. 3, longitudinally extending indicia 70 are provided on the outer surface of the piston rod 46 and cooperating circumferentially extending indicia 72 are provided adjacent the sleeve tip 68, the indicia 70 and 72 cooperating in well-known micrometer-like fashion accurately to indicate the location of the sleeve 64 along the piston rod 46. Since that location determines the degree to which the piston 58 may be moved within the cylinder 12, and hence the volume of liquid dispensed on each reciprocation of the piston 58 through that range of movement, the graduations 70 and 72 may be calibrated directly in terms of the volume of liquid to be dispensed.

Once the sleeve 64 defining the adjustable stop 60 has been positioned along the piston rod 46 at a point corresponding to the desired volume of liquid to be dispensed, it may be locked in that position by means of a lock nut 74 threadedly received on the externally threaded surface 62 of the piston rod 46 and adapted to be screwed down onto the upper surface of the sleeve 64.

To facilitate movement of the piston rod 46 up and down a ring 76 or other handle may be secured thereto in any appropriate fashion, as by providing the piston rod 46 with an axial internally threaded passage 78 into which an externally threaded projection 80 from the handle 76 is adapted to be threadedly received.

The dispensing device is, as is apparent from the above description, separate from the bottle B. It may be used independently of a bottle B by being hand-held, the tip 20 of the conduit 18 being immersed into any supply of liquid either directly or by way of a tube or other conduit connected to the tip 20. It may also, as is here specifically illustrated, be mounted on and used directly with a bottle B such as a conventional chemical reagent bottle.

The first step in the use of the device is to ensure that air is removed from the liquid delivery system, since the presence of a compressible medium in that system will adversely affect the accuracy of reproducibility of the amount of liquid dispensed. One way in which air can be eliminated is as follows: Rotate the device, after it has been inserted into the bottle neck 4, until the conduit 24 is on the same side as the bottle vent 6. Remove the plug 32 from the end of the tube 30 and connect the tube end to the vent 6. Move the piston 58 up and down a few times. When the piston 58 is raised liquid will be sucked up into the cylinder 12, the check value 22 permitting that liquid flow. When the piston 58 is lowered the check valve 22 will prevent fluid flow, and hence fluid will be forced out through the outlet 16 into the conduit 24 and the tube 30 and returned to the bottle B via the vent 6 and the space 36, the check valve 28 permitting fluid flow in that direction. After this has been repeated a few times the liquid system of the dispensing device A will be substantially filled with liquid. There may be a small air bubble above the vent 16, but this can be eliminated by tilting the bottle B and device A until the outlet 16 faces upwardly, after which the piston 58 is moved inwardly. Once the liquid system has been thus cleared of air the tube 30 is removed from the vent 6, the device A is rotated relative to the bottle B substantially to the position shown in FIGS. 1 and 2, and it is ready for dispensing.

One-hand dispensing is readily accomplished by placing the thumb in the ring 76 and grasping the concave surface 56 of the flange 48 between forefinger and middle finger. This leaves the other hand of the operator free to manipulate the tube 30 and direct its tip to the precise point where liquid delivery is desired.

As has been indicated above, the precise amount of liquid delivered during each cycle of operation of the piston 58 from its lowermost position to its uppermost position and back again to its lowermost position is determined by the setting of the sleeve 64 relative to the piston rod 46, and that setting, in terms of desired volume of liquid to be dispensed in each cycle of operation, is indicated by the calibrated indicia 70 and 72. In a preferred form each division of the indicia 70 on the piston rod 46 may represent 1.0 ml. of liquid and each division of the indicia 72 on the sleeve 64 may represent 0.05 ml. so that by interpolation the volume setting can easily be made to an accuracy of 0.01 ml. The absolute accuracy of the volume dispensed will be better than 1% or 0.05 ml., whichever is the greater, and with reasonably careful technique reproducibility to 0.2% or 0.01 ml. can be achieved.

Cleaning of the dispensing device is exceedingly readily accomplished. By screwing the nut 52 downwardly off from the flange 48, the wall 42 is released and it may be lifted from the cylinder 12, carrying with it the piston 58 and the piston rod 46. This exposes the interior of the cylinder 12 and the associated glass parts to cleaning in conventional fashion. The wall 42 and flange 48, the piston rod 46 and the sleeve 64 may be formed of corrosion-resistant polypropylene which can be accurately machined and which can also be subjected to autoclave purifying conditions without damage and which may be cleaned with detergent solutions. The Teflon piston 58 will resist the strongest of cleaning agents.

During normal operation of the device the liquid being dispensed will contact only glass or Teflon, and hence the possibility of reagent contamination and dispenser corrosion are minimized.

When the device A is in the neck 4 of a bottle B it may seal the bottle and thus prevent evaporation of the bottle contents by rotation of the bottle stopper part 10 to a position such that its apertures 34 are out of registration with the passage 8 in the bottle vent 6, but the device A may be rotated to its position shown in FIGS. 1 and 2, with a vent 34 in registration with the passage 8, when air is to be admitted to the interior of the bottle B, as will usually be the case when dispensing is being carried out.

From the above it will be appreciated that the device of the present invention represents virtually the utmost in simplicity while providing for high accuracy and carefully controlled adjustability of the amount of liquid dispensed, the device being settable to dispense a desired volume of liquid and thereafter being actuatable a virtually unlimited number of times in order to dispense each time precisely the desired volume of liquid. Changes in the amount of liquid to be dispensed may be easily, rapidly and accurately made. The dispensing device is easily cleaned, light, durable, and capable of use even for the dispensing of highly corrosive reagents. It may be used with or without reagent botles and may be carried and manipulated by one hand if desired. Its accuracy combined with its adaptability and inexpensiveness make it suitable for use in a wide range of environments, from small laboratories and experimental operations to factories and production operations.

While but a single embodiment of the present invention has been here specifically disclosed, it will be apparent that many variations may be made in the details thereof, all within the spirit of the invention as defined in the following claims.

I claim:

1. A micrometric dispenser comprising a cylinder having a fluid inlet, a fluid outlet, an open operating end, and an end wall detachably secured in place and closing said operating end, said wall having an opening therethrough whose axial length is substantially equal to the thickness of said wall, a piston rod slidable through said opening, a piston carried by said piston rod and sealingly slidable along the inside of said cylinder, first stop means on said piston rod in said cylinder effective to operatively engage said cylinder and limit the degree to which said piston rod can be slid out from said cylinder, and second stop means on said piston rod outside said cylinder effective to operatively engage said cylinder end wall and limit the degree to which said piston rod can be slid into said cylinder, said second stop means being adjustably positionable along the length of said piston rod, thereby to adjustably vary the degree to which said piston rod may be reciprocated relative to said cylinder, said piston rod having a threaded outer surface and said second stop means being threadedly engaged with said surface, thereby being rotatable on said piston rod to produce said adjustability along said rod, and said second stop means comprising a first part making threaded engagement with said rod surface at a point remote from said cylinder end wall and a sleeve part extending from said first part toward said end wall while out of engagement with said rod.

2. The dispenser of claim 1, in which said open operating end of said cylinder has a radially outwardly extending rim, said end wall is received on said open end and has a depending flange extending around said rim and to points below said rim, said flange being provided with a threaded internal surface, and a manually rotatable screw received over said cylinder inside said flange, threadedly engage with said flange, and operatively engaging said rim, thereby to releasably retain said wall on said operating end of said cylinder, said flange having a concave radially outer surface defining a finger-engaging area.

References Cited

UNITED STATES PATENTS

| | | | |
|---|---|---|---|
| 886,720 | 5/1908 | McCloskey et al. | 222—309 |
| 2,043,578 | 6/1936 | Markus | 222—309 |
| 2,096,461 | 10/1937 | Mane et al. | 222—309 X |
| 3,122,280 | 2/1964 | Goda | 222—309 |
| 3,211,335 | 10/1965 | Shapiro | 222—309 X |
| 1,913,062 | 6/1933 | Wheeler | 222—47 |
| 2,979,233 | 4/1961 | Smith et al. | |
| 3,013,435 | 12/1961 | Rodrigues | 222—309 X |
| 3,067,915 | 12/1962 | Shapiro et al. | 222—383 X |
| 3,074,597 | 1/1963 | Felts | 222—43 |
| 3,085,719 | 4/1963 | Weber | 222—309 |
| 3,144,177 | 8/1964 | Cookson | 222—309 |
| 3,261,509 | 7/1966 | Shevell | 222—309 |

SAMUEL F. COLEMAN, *Primary Examiner.*

U.S. Cl. X.R.

222—309, 383